UNITED STATES PATENT OFFICE.

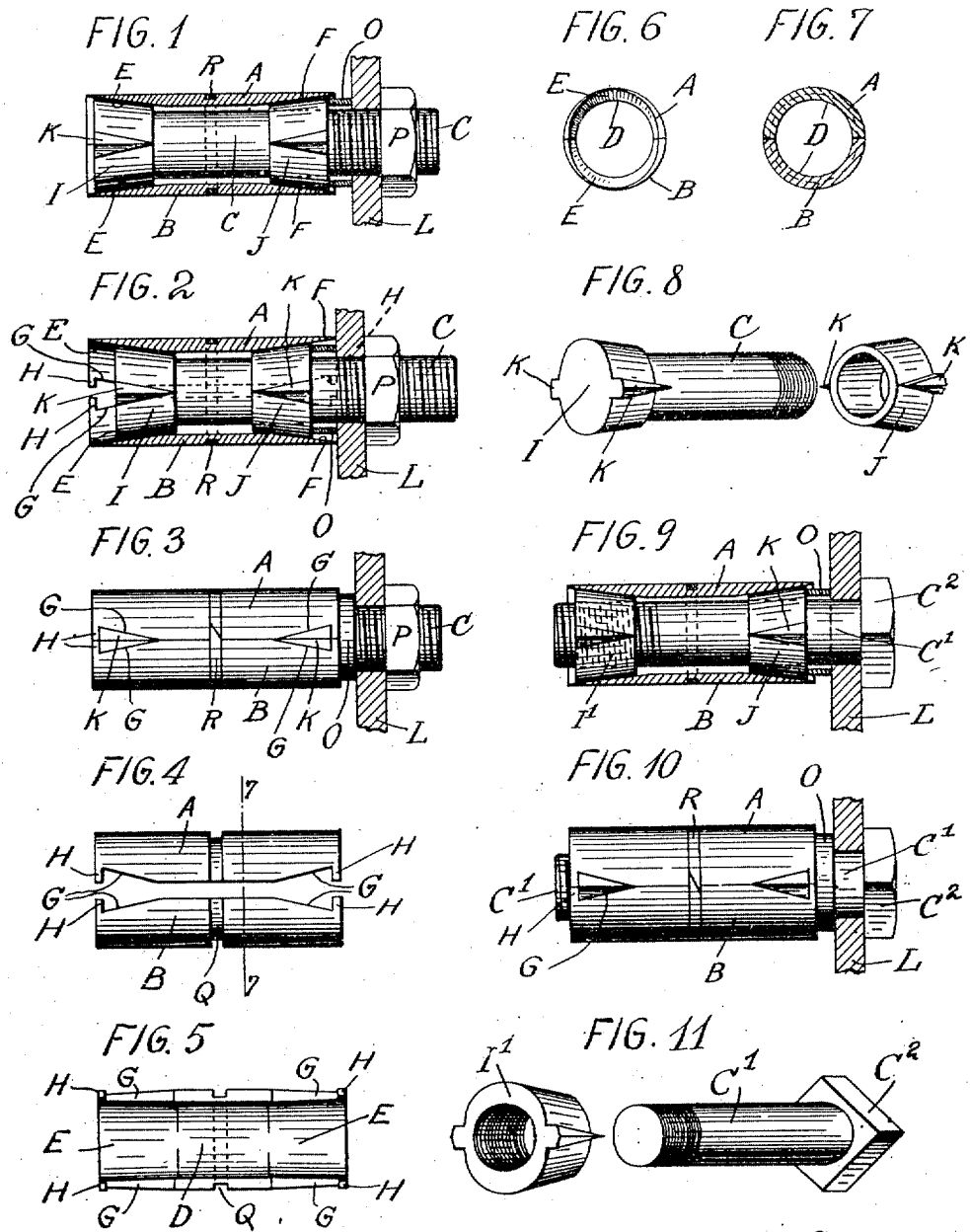

CHARLES J. CLEMENTS, OF NEW YORK, N. Y.

EXPANSION-BOLT.

981,382.         Specification of Letters Patent.    Patented Jan. 10, 1911.

Application filed July 10, 1907. Serial No. 382,997.

*To all whom it may concern:*

Be it known that I, CHARLES J. CLEMENTS, a citizen of the United States, and resident of the borough of Brooklyn, county of Kings, city and State of New York, have invented certain new and useful Improvements in Expansion-Bolts, of which the following is a specification accompanied by drawings.

This invention relates to expansion bolts for use in stone, brick work and the like, and the objects of the invention are to improve upon the construction of such devices and render them stronger and more efficient in use than heretofore.

The invention consists of the expansion bolt substantially as hereinafter fully described and claimed in this specification and shown in the accompanying drawings.

Figure 1 is a longitudinal sectional view taken through an expansion bolt embodying the invention; Fig. 2 is a longitudinal sectional view showing the shell or cartridge expanded; Fig. 3 is an outside view of the bolt in its shell or cartridge; Fig. 4 is a detail side elevation of the shell or cartridge; Fig. 5 is a side view looking at the inside of one-half of the cartridge; Fig. 6 is an end view of the cartridge; Fig. 7 is a sectional view of the cartridge on the line 7 x 7 of Fig. 4; Fig. 8 is a detail perspective view of the bolt; Fig. 9 is a longitudinal sectional view of one form of the expansion bolt; Fig. 10 is an outside view of Fig. 9; and Fig. 11 is a detail perspective view of the bolt used in Figs. 9 and 10.

Referring to the drawings, A and B represent the halves of the longitudinally divided shell or cartridge for the expansion bolt and C is the bolt proper. The divided shell is provided with a central circular bore D as illustrated in Fig. 7, while each end of the shell is provided with a rounded oval bore as illustrated in Fig. 6 in end view. In this instance the rounded oval form of the bore at each end is produced by tapering the interior of the halves of the shell at E and F, and preferably this taper is greater at those portions of the halves of the shell which are not divided than it is at the divided edges of the shell. The divided edges of the shell are also provided with beveled jaws G which may, if desired, have the retaining lugs H, although these lugs may be omitted.

The tapered rounded oval ends E and F of the longitudinally divided shell form recesses or seats for the wedge shaped head or nut of the bolt. In Fig. 1 the bolt C is shown provided with a rounded oval tapered head I provided with the wedges K projecting through each side and adapted to enter between the beveled jaws G. In the other tapered oval end of the shell is arranged the tapered rounded oval shaped wedge or collar J also provided with the wedge shape lugs K adapted to enter between the jaws G at said end of the shell. This collar is preferably provided with a smooth bore to receive the shank of the bolt C.

Between the collar J and the plate L adapted to be secured to a support is preferably arranged a sleeve O so that when the nut P is screwed up on the end of the bolt C against the plate L, the head I and collar J will be forced toward each other to expand the longitudinally divided shell or cartridge as illustrated in Fig. 2.

The longitudinally divided shell is preferably provided with a groove Q adapted to receive a split ring R of spring metal and thereby hold the parts of the shell together normally. As the head I and collar J are drawn toward each other, the portions A and B of the shell are forced apart by the action of the wedge shaped lugs K, and also by the wedging action of the oval tapered head I and collar J, the shape of which conforms to the oval opening at each end of the shell. As the major axis of the oval recesses in the shell grows longer the head I enters farther between the shell portions and constantly bears against the tapered parts E. The collar J also constantly bears against the tapered parts F, so that when the shell has been expanded as far as desired, there is a bearing between the shell and all four sides of the tapered head I and collar J, thus affording a secure and strong construction which rigidly holds the plate L in position.

In Fig. 9 another form of the expansion bolt is illustrated, in which the head for the bolt is shown in the form of a screw-threaded nut I', while the bolt C is provided with a head C², and the shank of the bolt is screw-threaded and engages the screw-threaded nut I' so that the head I' and the collar J having a smooth bore may be drawn toward each other when the bolt is screwed up.

In accordance with this invention, it will be seen that when the shell is to be expanded, the expansion does not depend entirely upon the wedge shaped lugs or wings K on the sides of the head or nut, and collar, but this expansion is due principally to the bearing of the head or nut, and collar, on the tapered sides of the shell. The lugs or wings K aid in keeping the head or nut, or collar from turning in the shell, and enable a cartridge form to be obtained.

The tapering oval bore of the shell and the tapering oval head adapted to slide therein are each provided with a continuous circumferential curvature of gradually changing radii in both transverse and longitudinal directions. These parts so constructed are economical to manufacture and efficient in operation.

It will be seen that the two members A and B constituting the shell provide at each end of the shell two inclined trough-shaped bearing surfaces E, and that these trough-shaped surfaces receive and roughly fit the head. These trough-shaped bearing surfaces converge toward the middle plane from the point of view of Figs. 1, 3, and 9, and are nearly parallel or non-convergent from the point of view of Fig. 5, in order that the head which is fitted to shape these bearing surfaces as explained can slide along them without jamming or hindrance, provided that the expansion due to the wedging action in the proper plane occurs. At the same time the head is guided in all directions laterally by the bearing surfaces.

I claim and desire to obtain by Letters Patent the following:

1. An expansion bolt comprising a divided shell having at its ends oval bores the major axes of which are at right angles to the plane of division and which bores taper in respect at least to their major axes in opposite directions and corresponding tapered oval heads which are provided with wedge shaped wings projecting from their minor axes and which wings coöperate with beveled jaws on the divided edges of the shell and means for longitudinally moving the two heads, whereby in the simultaneous expansion of both ends of the shell the wedge shaped wings may coact with the said beveled jaws and the oval heads coact with the said oval bores throughout the expanding motion.

2. The combination with an expansible tubular shell longitudinally divided along a central plane, the said shell being provided with a longitudinal bore having oval inwardly tapered extremities the minor axes of which are in the dividing plane of the shell, and with longitudinally tapered wing-guiding recesses in the immediate proximity of the said dividing plane, of a bolt provided with an oval longitudinally tapered head and an oval longitudinally tapered collar, oppositely disposed with respect to each other and respectively fitted to the said oval extremities of the bore, and each provided with longitudinally tapered side wings projecting in the direction of their minor axes and fitted to the said wing-guiding recesses, and means for forcing the said head and collar toward each other whereby during such operation of the last said means the coacting surfaces of the head and collar and the shell segments remain in substantial contact throughout and both ends of the shell are correspondingly expanded.

3. The combination with a longitudinally divided expansible shell provided with a bore having outwardly flaring oval extremities at both ends the said shell having longitudinally tapered wing-guiding recesses, of a nonrotatable bolt arranged to pass through the said shell and having an oval head secured fast thereto, and fitted to one of the oval extremities of the bore, the said head having longitudinally tapered side wings fitted to the said wing-guiding recesses, an oval collar loosely mounted upon the bolt and fitted to the other oval extremity of the bore, the said collar also provided with longitudinally tapered side wings fitted to the said wing-guiding recesses in the shell, the said bolt being provided with a screw threaded portion, and a nut fitted to the said screw threaded portion.

In testimony whereof I have signed this specification in the presence of two subscribing witnesses.

CHARLES J. CLEMENTS.

Witnesses:
 EDW. A. STULZ,
 I. B. MOORE.